United States Patent [19]

Fornasari et al.

[11] Patent Number: 5,756,579
[45] Date of Patent: May 26, 1998

[54] RUBBER-REINFORCED VINYL AROMATIC (CO) POLYMER

[75] Inventors: Vilma Fornasari, Guastalla; Davide Preti, Revere; Anna Grazia Rossi, Mantova; Roberto Nocci, Virgilio, all of Italy

[73] Assignee: Enichem S.p.A., Milan, Italy

[21] Appl. No.: 785,086

[22] Filed: Jan. 21, 1997

Related U.S. Application Data

[63] Continuation of Ser. No. 567,738, Dec. 5, 1995, abandoned, which is a continuation of Ser. No. 257,202, Jun. 9, 1994, abandoned.

[30] Foreign Application Priority Data

Jun. 16, 1993 [IT] Italy .................. MI93A1291

[51] Int. Cl.⁶ .................. C08L 51/04; C08L 53/02
[52] U.S. Cl. .................. 525/99; 525/71; 525/98; 525/316
[58] Field of Search .................. 525/99, 98, 316, 525/71

[56] References Cited

U.S. PATENT DOCUMENTS

| | | | |
|---|---|---|---|
| 3,497,572 | 2/1970 | Childers et al. | 525/88 |
| 4,187,261 | 2/1980 | Slima | 525/243 |
| 4,294,937 | 10/1981 | Whitehead | 525/99 |
| 4,524,180 | 6/1985 | Sun | 525/71 |
| 5,250,618 | 10/1993 | Faluso | 525/89 |

FOREIGN PATENT DOCUMENTS

| | | |
|---|---|---|
| 0 021 488 | 1/1981 | European Pat. Off. |
| 0 160 974 | 11/1985 | European Pat. Off. |
| 0 429 986 | 6/1991 | European Pat. Off. |
| 3221145 | 9/1988 | Japan . |
| 3241054 | 10/1988 | Japan . |

OTHER PUBLICATIONS

Patent Abstracts of Japan, vol. 13, No. 134 (C-581), Apr. 4, 1989, JP-A-63 301 210, Dec. 8, 1988.

*Primary Examiner*—Joseph L. Schofer
*Attorney, Agent, or Firm*—Oblon, Spivak, McClelland, Maier & Neustadt, P.C.

[57] ABSTRACT

A rubber-reinforced vinyl aromatic (co)polymer comprising a polymeric matrix and a rubber phase dispersed and/or grafted in the polymeric matrix and consisting of a mixture of (i) a diene rubber and (ii) a vinyl aromatic monomer/conjugated 1,3-diene linear block copolymer, said block copolymer having a diene content exceeding 80 wt % and, respectively, a vinyl aromatic monomer content of less than 20 wt %.

22 Claims, No Drawings

RUBBER-REINFORCED VINYL AROMATIC (CO) POLYMER

This application is a Continuation of application Ser. No. 08/567,738, filed on Dec. 5, 1995, now abandoned, which is a Continuation of application Ser. No. 0/257,202, filed on Jun. 9, 1994, abandoned.

This invention relates to a rubber-reinforced vinyl aromatic co(polymer) with an excellent balance of physical and mechanical properties and high gloss, and a continuous mass-solution polymerization process for its preparation.

More particularly, the invention relates to a diene rubber-reinforced vinyl aromatic (co)polymer with excellent physical and mechanical properties such as impact strength, elastic modulus, yield stress and stress at break, combined with high gloss, and a continuous mass-solution polymerization process for producing this copolymer.

Vinyl aromatic (co)polymers reinforced with rubber, in particular with diene rubber, represent a well known class of commercially available engineering polymers widely described in the literature. Specific examples of these (co) polymers are for example styrene/acrylonitrile copolymers containing rubber particles, for example polybutadiene, dispersed in the polymeric matrix, generally known as ABS resins, and high impact polystyrene, generally known as HIPS, comprising a continuous polystyrene phase in which rubber particles, for example polybutadiene, are dispersed.

These rubber-reinforced vinyl aromatic (co)polymers can be prepared by various polymerization processes which can be continuous, batch, mass, solution, or combined mass/suspension. The continuous mass polymerization process is known and described for example in U.S. Pat. Nos. 2,694,692, 3,243,481 and 3,658,946, and in published European patent application 0,400,479.

This process consists of dissolving the rubbery material in the vinyl aromatic monomer or monomer mixture, adding possibly a radical polymerization initiator and an inert diluent, and then polymerizing the resulting solution. Immediately after the polymerization reaction commences, the solution of rubbery material in the monomer or monomer mixture separates into two phases, of which the former, consisting of a solution of the rubber in the monomer, initially forms the continuous phase, whereas the latter, consisting of a solution of the resultant (co)polymer in the monomer, remains dispersed in form of droplets in said continuous phase. As polymerization and hence conversion proceed the quantity of the latter phase increases at the expense of the former. As soon as the volume of the latter phase equals that of the former, a phase change occurs, generally known as phase inversion.

When this phase inversion takes place, droplets of rubber solution form in the polymer solution. These rubber solution droplets incorporate by themselves small droplets of what has now become the continuous polymer phase. During the process, grafting of the polymer chains on the rubber takes place too.

Generally, the polymerization is carried out in several stages. In the first polymerization stage, known as prepolymerization, the solution of rubber in the monomer or monomer mixture is polymerized until phase inversion is reached. Polymerization is then continued up to the desired conversion.

Mass-solution polymerization affords rubber-reinforced vinyl aromatic (co)polymers with a good balance of physical and mechanical properties, however the surface gloss of such (co)polymers is not always quite satisfactory. Concerning that point, it is known that the surface gloss of diene rubber-reinforced vinyl aromatic (co)polymers can be improved by reducing the size of the rubber particles to less than 1 micrometer, e.g. by vigorous stirring during polymerization. However, this approach has not been successful because the usually available linear polybutadiene rubbers with low-to-medium cis isomer content have a rather high molecular weight and then a high solution viscosity, so that even with a strong agitation, it is not possible to achieve satisfactory rubber sizing, at least for the rubber concentrations commonly used in these (co)polymers (5–15 wt %). Linear polybutadiene rubbers of low molecular weight and hence of reduced solution viscosity could be easily sized under stirring, but these rubbers suffer from the known cold flow drawback, which introduce additional problems in their storage and handling.

U.S. Pat. No. 4,421,895 discloses the use of a diene rubber with a solution viscosity of 80 mPa.s or less when measured as a 5 wt % solution in styrene at 25° C. in ABS production. Specifically, the diene rubber proposed in this patent is a styrene-butadiene linear block polymer. This type of block rubber does not suffer from cold flow and easily affords the formation of fine particles. Using this type of linear block rubber and operating in accordance with the process described in this patent, an ABS with rubber particles of less than 0.7 micrometers is obtained. However, by using the above styrene-butadiene linear block polymer, the surface gloss improvement is achieved at the expense of the other physical and mechanical properties, and in particular the impact strength, so that the ABS obtained does not offer the desired combination of high physical and mechanical properties and surface gloss.

It is also known from the literature that rubber-reinforced vinyl aromatic (co)polymers with high impact strength and surface gloss can be prepared by using as the rubber an arm-type or radial block polymer. The use of such block rubber polymers in rubber-reinforced vinyl aromatic (co) polymer production is described for example in U.S. Pat. Nos. 4,587,294 and 4,639,494, in published European patent application 0,277,687 and in Japanese patent publications 59-232,140 and 59-179,611.

Arm-type or radial block rubbers are produced by well known methods, by alkyllithium initiators, forming firstly the linear polymer with active chain ends carrying a negative charge and $Li^+$ as counter-ion, and then adding a coupling agent, such as silicon tetrachloride, capable to react with these chains ends bind several polymer chains to the silicon atom, as described for example in U.S. Pat. Nos. 4,183,877, 4,340,690–691, 4,403,074, 4,221,884, 3,688,162 etc.

Compared with other known diene rubbers, arm-type or radial block rubbers afford (co)polymers with an improved balance of gloss and physical and mechanical properties, but have the drawbacks of requiring a more complex manufacturing process and of giving rise to corrosion problems by residual unreacted coupling agent.

In its most general aspect, the present invention solves the aforesaid drawbacks by providing rubber-reinforced vinyl aromatic (co)polymers with an excellent balance of physical and mechanical properties, combined with high surface gloss, using as rubbery material a mixture of i) a diene rubber and ii) a vinyl aromatic monomer/conjugated 1,3-diene linear block copolymer, in which said block copolymer has a diene content exceeding 80 wt % and, respectively, a vinyl aromatic monomer content of less than 20 wt %.

Consequently, the present invention provides a rubber-reinforced vinyl aromatic (co)polymer comprising a polymeric matrix and a rubber phase dispersed and/or grafted within the polymeric matrix, wherein said rubber phase consists of a mixture of i) a diene rubber and ii) a vinyl aromatic monomer/conjugated 1,3-diene linear block copolymer, said block copolymer having a diene content exceeding 80 wt % and, respectively, a vinyl aromatic monomer content of less than 20 wt %.

The diene rubber i) used in the vinyl aromatic (co) polymer of the present invention can be either natural or synthetic. Suitable synthetic diene rubbers are those consisting of a conjugated 1,3-diene polymer containing from 4 to 6 carbon atoms and in articular polybutadiene, polybutadiene with high-to-medium cis and low viscosity, polyisoprene, or copolymers of butadiene and/or isoprene with styrene or other monomers, containing more than 50 wt % of butadiene or isoprene.

Polybutadiene with the following characteristics is particularly preferred:

- a Mooney viscosity of between 20 and 70 and preferably between 25 and 65 ML 1+4 at 100° C., when measured in accordance with ASTM D 1646-80;
- a solution viscosity of between 40 and 200 cps and preferably between 40 and 120 cps, when measured as a 5 wt % solution in styrene at 25° C.;
- a 1,2-vinyl content of between 5 and 35 and preferably between 7 and 14 wt %; and
- a 1,4-cis content of between 20 and 85 and preferably between 25 and 45 wt %.

This type of polybutadiene can be prepared by well known solution polymerization methods, in the presence of a lithium-organic compound as catalyst, and a Lewis organic base, in order to facilitate the 1,2-insertion of the monomer (vinylating agent). Suitable catalysts include methyllithium, n-, t- or sec-butyllithium, n-decyllithium, phenyllithium, cyclohexyllithium, 4-butylcyclohexyl lithium etc. Suitable vinylating agents include polar compounds such as ethers, for example dimethyl ether, diethyl ether, methylethyl ether, di-n-propyl ether etc., thioethers, and amines such as dimethylethyl amine, tri-n-butyl amine, pyridine, quinoline etc., as described in Japanese patent publication 15386/61 and in J. Polymer Sci. 17, 299 (1960).

Polybutadienes with the aforesaid properties are well known and are commercially available for example under the commercial name of INTENE$^R$ of Enichem Elastomeri, and BUNA$^R$ CB NF 35 of Bayer. The linear block copolymers ii) can be represented by one of the following general formulas (I), (II) and (III):

(I) S-B;

(II) $S_1$-B-$S_2$;

(III) $B_1$-$S_1$-$B_2$-$S_2$;

in which S, $S_1$ and $S_2$ are non-elastomeric polymer blocks of a vinyl aromatic monomer, with equal or different molecular weights, and B, $B_1$ and $B_2$ are elastomeric polymer blocks based on a conjugated diene, with equal or different molecular weights. In these linear block copolymers, the non-elastomeric polymer blocks have a molecular weight of between 5000 and 250,000 and the elastomeric polymer blocks have a molecular weight of between 2000 and 250,000. Random and/or tapered portions can be present among the polymer blocks S, $S_1$, S2 and B, $B_1$, $B_2$. In the tapered portion the passage between the blocks B, $B_1$, $B_2$ and S, $S_1$, $S_2$ can be gradual in the sense that the proportion of vinyl aromatic monomer in the diene polymer increases progressively in the direction of the non-elastomeric polymer block, whereas the proportion of conjugated diene progressively decreases. In the random portion the vinyl aromatic monomer and the conjugated diene follow each other randomly. The molecular weights of the random and/or tapered portions are preferably between 500 and 30,000. These linear block copolymers can be prepared by methods well known to the expert of the art, for example by firstly forming a vinyl aromatic polymer block by anionic polymerization in an inert solvent in the presence of a lithium organometallic catalyst (initiator), then forming the conjugated diene polymer block by adding this monomer, then possibly forming a further vinyl aromatic polymer block by adding the vinyl aromatic monomer. The linear block copolymers are prepared in an inert hydrocarbon solvent, such as pentane, hexane, benzene, cyclohexane etc., at a temperature of between 40° and 120° C. in the presence of catalytic quantities of an alkyl, cycloalkyl or aryl lithium compound such as methyllithium, n-butyllithium, sec-butyllithium, cyclohexyl lithium, phenyllithium etc.

These linear block copolymers are already known in the literature and are described for example in U.S. Pat. No. 3,265,765. Further details on the physical and structural characteristics of these copolymers are given in B. C. Allport et al. "Block Copolymers", Applied Science Publishers Ltd. 1973.

Linear block copolymers ii) particularly preferred for the purposes of the present invention are those having a Mooney viscosity of not less than 20 ML-1+4 at 100° C., and preferably between 25 and 50, when measured in accordance with ASTM D 1646-80, a viscosity in solution of not less than 20 cps between 25 and 60 cps when measured as a 5 wt % solution in styrene at 25° C., and a styrene content of 15 wt % or less.

These linear block copolymers are available commercially, for example under the name of STEREON$^R$ 720, produced and marketed by Firestone.

Conjugated dienes, suitable for preparing the linear block copolymers ii) are those containing from 4 to 8 carbon atoms in the molecule, such as 1,3-butadiene, isoprene, 2,3-dimethyl-1,3-butadiene, piperylene and mixtures thereof.

1,3-butadiene is particularly preferred.

If high-gloss, high-impact polystyrenes (HIPS) are to be prepared, it is advisable to add to the mixture of aforesaid rubbers i) and ii) a further vinyl aromatic monomer/ conjugated 1,3-diene linear block copolymer of the aforesaid type having a vinyl aromatic monomer content exceeding 20 wt % and preferably between 30 and 50 wt %, in a quantity of between 5 and 20 wt % on the rubber-reinforced vinyl aromatic (co)polymer.

The polymeric matrix of the rubber-reinforced (co) polymers of the present invention can be either a polymer derived from one or more vinyl aromatic monomers or a copolymer derived from one or more vinyl aromatic monomers and one or more acrylic monomers.

The term vinyl aromatic monomer as used in the present description and claims comprises the ethylenically unsaturated compounds of general formula (IV):

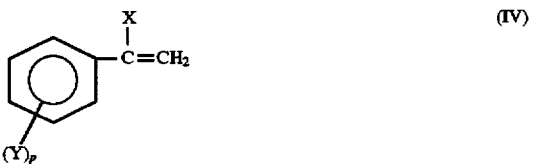

in which X represents hydrogen or a $C_1$–$C_4$ alkyl radical, p is zero or a whole number between 1 and 5, and Y represents a halogen or a $C_1$–$C_4$ alkyl radical.

Examples of vinyl aromatic monomers of the aforesaid general formula are: styrene; methylstyrene; mono-, di-, tri-, tetra- and penta-chloro-styrene and the corresponding alphamethyl-styrenes; styrenes alkylated in the nucleus and the corresponding alpha-methyl-styrenes; ortho- and para-methyl-styrenes; ortho- and para-ethyl-styrenes; ortho- and para-methyl-alpha-methyl-styrenes etc. These monomers can be used alone or in mixture with each other or with other copolymerizable monomers such as maleic anhydride.

Styrene is particularly preferred.

The acrylic monomer is preferably acrylonitrile. Other acrylic monomers can be advantageously used, such as methacrylonitrile, acrylic and methacrylic acid and their alkylesters containing from 1 to 6 carbon atoms in the alkyl radical.

The vinyl aromatic monomer and acrylic monomer quantities used for producing the copolymer vary on the basis of the desired physical and mechanical properties of the final rubber-reinforced vinyl aromatic copolymer. Generally the quantity of acrylic monomer varies from 5 to 45 wt % and preferably from 15 to 35 wt %, the vinyl aromatic monomer correspondingly varying from 95 to 55 wt % and preferably from 85 to 65 wt %, based on the total weight of the vinyl aromatic monomer/acrylic monomer copolymer.

In the rubber phase mixture, the proportion of diene rubber i) with respect to the linear block copolymer ii) is not critical for the purposes of the present invention. Generally, the rubber phase mixture comprises from 1 to 99 wt % and preferably from 20 to 80 wt % of diene rubber i), and correspondingly from 99 to 1 wt % and preferably from 80 to 20 wt % of linear block copolymer ii). The quantity of diene rubber mixture i) and block copolymer ii) in the rubber-reinforced (copolymer generally varies from 4 to 30 wt % and preferably from 6 to 25 wt % on the (co)polymer weight. Although the rubber-reinforced (co)polymer of the present invention can be prepared by any conventional method used for producing crosslinked high impact polymers, such as mass, solution, suspension, emulsion or mass-suspension polymerization, the advantages are more apparent when continuous mass-solution polymerization is carried out.

With this polymerization method, the mixture of diene rubber i) and block copolymer ii) is dissolved in the monomer or monomers, possibly in the presence of an inert solvent in a quantity which can vary from 5 to 100 wt % on the mixture, the resultant solution being subjected to polymerization in the presence of an initiator. Generally, the polymerization is carried out in two or more agitated vertical tubular plug flow reactors, arranged in series. Vertical tubular reactors with a length/diameter ratio exceeding 2 and preferably between 3 and 10 are preferred.

Each reactor is maintained at a pressure exceeding that at which the feed components evaporate, generally between 0.5 and 5 bar, and is divided into two or more zones heated at different temperatures between 70° and 170° C. It is preferable to obtain at the exit of the first reactor a polymerization conversion of 20–60 wt % and preferably 25–50 wt % on the monomers, the polymerization then being completed in the subsequent reactor or reactors. It is also preferable that the residence time of the monomers in the first zone of the first reactor is at least equal to that necessary for halving the life of the initiator at polymerization temperature. In this way, a higher rubber grafting to the polymeric matrix (grafting ratio) is achieved, this one being the ratio of the insoluble constituent (gel) in a solvent, to the fed rubber quantity. The solvent in the case of HIPS is a 57/43 toluene/methylethylketone mixture and in the case of ABS is acetone, at room temperature. Grafting ratios of between 2 and 4 can be obtained. Having attained the required degree of conversion (65–95%), the unreacted monomers and any solvent present are removed under vacuum at high temperature (200°–260° C.), and the resulting polymer is extruded through a die, cooled and cut into pellets of the required size. The gaseous products removed under vacuum are condensed and possibly recycled to the first reactor.

The mixture of rubbers i) and ii) and the initiator can be dissolved in the monomer or monomers and solvent, if present, in a single mixer or preferably in two separate mixers in which the vinyl aromatic monomer, the rubbers and the inert solvent are mixed in the first, which is maintained at a temperature not exceeding 100° C., and the initiator and acrylic monomer, if present, are added in the second, which is not heated.

Examples of inert solvents which can be used include aromatic hydrocarbons liquid at the polymerization temperature, such as toluene, ethylbenzene, xylenes or mixtures of these compounds in any proportions.

The initiators used are the conventional ones generally used in styrene polymerization, such as organic peroxide radical initiators. Examples of such initiators are dibenzoyl peroxide, tert.butyl peroctoate, tert.butyl perbenzoate, di-tert.butyl peroxide, 1,1'-di-tert.butyl peroxycyclohexane etc. These initiators are added in a quantity of between 0.005 and 0.1 wt % on the monomers.

The rubber-reinforced (co)polymers of the present invention comprise rubber particles with an average diameter variable from 0.1 to 5 micrometers and preferably from 0.1 to 1.5 micrometers, and contain grafted and non-grafted polymer occlusions with the typical core-shell structure. These occlusions can be displayed and measured by usual electron microscopy techniques.

The rubber-reinforced (co)polymers of the present invention have an excellent balance of physical and mechanical properties, such as impact strength at room temperature or lower than 0° C., elongation at break, yield stress and tensile stress at break, flexural modulus etc., and high gloss. Owing to these characteristics, the rubber-reinforced (co)polymers of the present invention are suitable for use in all quality applications, typical of the corresponding (co)polymers obtained by the conventional emulsion polymerization method.

Some illustrative examples are given hereinafter for a better understanding of the present invention and to enable it to be implemented in practice, but are in no case to be considered as limitative thereof.

The following methods were used in the examples for determining the characteristics of the (co)polymers obtained:

Mechanical properties

IZOD impact strength was determined at 23° C. in accordance with ASTM D 256 on notched specimens of 3.2 mm and 12.7 mm thickness; yield stress, tensile stress at break, elongation at break and tensile modulus were determined in accordance with ASTM D 638; flexural strength and modulus were determined in accordance with ASTM D 790.

Thermal properties

The VICAT softening point was determined under 5 kg load in oil, in accordance with ISO 306.

Rheological properties

The melt flow index (M.F.I.) was determined in accordance with ASTM D 1238 at 220° C. and 10 kg for Examples 1 to 4, and at 200° C. and 5 kg for Example 5.

Optical properties

Gloss was measured by a GLOSSMETRO$^R$ ZMG 1022 on samples having dimensions of 17.5 cm×7.5 cm and with three different consecutive thicknesses of 4 mm, 3 mm and 1.5 mm respectively. The measurement was made on that part of the sample having a thickness of 3 mm, with a 60° angle of incidence for Examples 1 to 4 and with a 20° angle of incidence for Example 5. The specimens were injection moulded at 230° C. for Examples 1 to 4 and at 220° C. for Example 5, the mould was maintained at 35° C. and had a smooth surface with a surface roughness factor 0.02.

COMPARATIVE EXAMPLE 1

All parts are by weight, unless otherwise specified.

The following reactants were fed into a CSTR mixer reactor of 500 liter volume:

57.2 parts by weight of styrene;

18.1 parts by weight of acrylonitrile;

7.2 parts by weight of BUNA$^R$ CB NF 35 polybutadiene rubber;

17.5 parts by weight of ethylbenzene;

0.25 parts by weight of a phenolic antioxidant (IRGANOX$^R$ 1076);

0.035 parts by weight of a peroxide initiator (1,1'-ditert.butylperoxy-3,3,5-trimethylcyclohexane); and 0.045 parts by weight of a chain transfer agent (tert.dodecyl mercaptan).

The resultant mixture was fed, at a temperature of 70° C. and a rate of 30.8 l/h, to the head of a first vertical tubular reactor of the plug flow of full type having a volume of 100 l and a length/diameter ratio of 4.

The reactor was divided into two reaction zones, thermostated as to keep the reaction mixture according to the following temperature profile:

| 1st zone | 105° C. |
|---|---|
| 2nd zone | 110° C. |

The reactor was equipped with an agitator composed of 48 horizontal arms rotating at 40 rpm. The pressure within the reactor was 3 bar.

The residence time of the reaction mixture in the first zone of the first reactor was about 90 minutes, the total reaction residence time being about 3 hours.

The reaction mixture, discharged continuously from the reactor and having a solids content of about 40 wt %, was fed to a second vertical tubular reactor identical with the first and thermostated as above, with the following temperature profile:

| 1st zone | 125° C. |
|---|---|
| 2nd zone | 150° C. |

The residence time of the reaction mixture in the second reactor was 3 hours.

The reaction mass leaving the second reactor had a solids content of 65 wt %, corresponding to a conversion of 77 wt %.

The reaction mass was then heated to 240° C. in a preheater and the solvent and unreacted monomers removed in an evaporator under a residual vacuum of 10 mm Hg.

The copolymer discharged from the evaporator had a total volatiles content of 0.05 wt %, its properties being given in the following table.

COMPARATIVE EXAMPLE 2

Example 1 was repeated replacing the polybutadiene rubber with a polystyrene-polybutadiene linear block polymer of type S-B (I) having a polystyrene content of 10 wt %, a polybutadiene content of 90 wt %, a weight average molecular weight of 135,000, as measured by gel permeation chromatography (GPC) with polybutadiene calibration (MARK-HOUWINK constants: k=3.9×10$^{-4}$ and α=0.713), and a weight average molecular weight of the polystyrene block of 20,900 as measured by GPC with polystyrene calibration (MARK-HOUWINK constants: k=1.5×10$^{-4}$ and α=0.7).

The copolymer discharged from the evaporator had a total volatiles content of 0.05 wt %, its properties being given in the following table.

EXAMPLE 3

Example 1 was repeated, replacing the polybutadiene rubber with a mixture consisting of 70 wt % of the linear block copolymer of Example 2 and 30 wt % of the polybutadiene rubber of Example 1. The copolymer discharged from the evaporator had a total volatiles content of 0.05 wt %, its properties being given in the following table.

EXAMPLE 4

Example 1 was repeated using the following reactant formulation:

57.7 parts by weight of styrene;

19.0 parts by weight of acrylonitrile;

4.3 parts by weight of the rubber mixture of Example 3;

17.0 parts by weight of ethylbenzene;

0.25 parts by weight of a phenolic antioxidant (IRGANOX$^R$ 1076);

0.035 parts by weight of a peroxide initiator (1,1'-ditert.butylperoxy-3,3,5-trimethylcyclohexane); and 0.060 parts by weight of a chain transfer agent (tert.dodecyl mercaptan).

The first reactor was divided into two reaction zones, thermostated as to keep the reaction mixture according to the following temperature profile:

| 1st zone | 104° C. |
|---|---|
| 2nd zone | 107° C. |

The second reactor was also divided into two zones, and thermostated as above, with the following temperature profile:

| 1st zone | 122° C. |
|---|---|
| 2nd zone | 150° C. |

The copolymer discharged from the evaporator had a total volatiles content of 0.05 wt %, its properties being given in the following table.

EXAMPLE 5

The following reactants were fed into a CSTR mixer reactor of 500 liter volume:

79.0 parts by weight of styrene;

2.25 parts by weight of the rubber mixture of Example 3

8.5 parts by weight of ethylbenzene;

1.89 parts by weight of white mineral oil;

0.1 parts by weight of a phenolic antioxidant (IRGANOX$^R$ 1076);

0.038 parts by weight of a peroxide initiator (1,1'-ditert.butyl-peroxy-3,3,5-trimethylcyclohexane);

0.015 parts by weight of a chain transfer agent (tert.dodecyl mercaptan); and 7.85 parts by weight of BUNA$^R$ BL 6533 rubber, this one being a linear polystyrene-polybutadiene block polymer of type S-B (I) having a polystyrene content of 40 wt %, a polybutadiene content of 60 wt %, a weight average molecular weight of 152,000 as measured by gel permeation chromatography (GPC) with polybutadiene calibration (MARK-HOUWINK constants: k=3.9×10$^{-4}$ and α=0.713), and a weight average molecular weight of the polystyrene block of 60,000, as measured by GPC with polystyrene calibration (MARK-HOUWINK constants: k=1.5=10$^{-4}$ and α=0.7).

The resultant mixture was fed, at a temperature of 100° C. and a rate of 41.2 l/h, to the head of a first vertical tubular reactor of the plug flow of full type, having a volume of 100 l and a length/diameter ratio of 4.

The reactor was divided into three reaction zones, thermostated as to keep the reaction mixture according to the following temperature profile:

| | |
|---|---|
| 1st zone | 118° C. |
| 2nd zone | 129° C. |
| 3rd zone | 140° C. |

The residence time of the reaction mixture in each of the three zones was about 48 minutes, the total reaction residence time being about 144 minutes.

The reaction mixture, discharged continuously from the reactor and having a solids content of about 40 wt %, was fed to a second vertical tubular reactor divided into two reaction zones, thermostated as above, with the following temperature profile:

| | |
|---|---|
| 1st zone | 150° C. |
| 2nd zone | 165° C. |

The residence time of the reaction mixture in the second reactor was 132 minutes.

The reaction mixture leaving the second reactor had a solids content of 75 wt %, corresponding to a conversion of 82 wt %.

The reaction mixture was then heated to 245° C. in a preheater and the solvent and unreacted monomers removed in an evaporator under a residual vacuum of 10 mm Hg.

The copolymer discharged from the evaporator had a total volatiles content of 0.06 wt %, its properties being given in the following table.

TABLE

| COMPOSITION | UNITS | EXAMPLES | | | | |
|---|---|---|---|---|---|---|
| | | 1* | 2* | 3 | 4 | 5 |
| Bound acrylonitrile (wt %) | | 21.5 | 21.5 | 21.9 | 22.5 | 0 |
| Total polybutadiene rubber (wt %) | | 10.4 | 10.5 | 10.5 | 7 | 14 |
| MECHANICAL PROPERTIES | | | | | | |
| IZOD 12.7 mm | (kg cm/cm) | 15.5 | 13 | 18.5 | 10.2 | 5.8 |
| IZOD 3.2 mm | (kg cm/cm | 19.5 | 17 | 22.5 | 13.9 | — |
| yield stress | (MPa) | 38.6 | 42 | 41 | 50 | 26.3 |
| tensile stress at break | (MPa) | 35. | 37 | 35 | 37.7 | 22. |
| elongation at break | (%) | 45 | 35 | 50 | 30 | 41.4 |
| tensile modulus | (MPa) | 2300 | 2550 | 2400 | 2770 | 1910 |
| flexural strength | (MPa) | 62 | 65 | 61 | 77 | — |
| flexural modulus | (MPa) | 2200 | 2450 | 2300 | 2650 | — |
| THERMAL PROPERTIES VICAT | (°C.) | 101 | 104 | 101 | 105 | 89 |
| RHEOLOGICAL PROPERTIES M.F.I. | (g/10 min) | 8 | 7.5 | 8.5 | 4.1 | 6.2 |
| OPTICAL PROPERTIES Gloss | (%) | 57 | 80 | 80 | 82 | 78 |

*Comparative examples

We claim:

1. A rubber-reinforced vinyl aromatic (co)polymer comprising a polymeric matrix and a rubber phase grafted onto the polymeric matrix, wherein said rubber phase consists of a mixture of:
   i) 20–80 wt % of a diene rubber and
   ii) 80–20 wt % of a vinyl aromatic monomer/conjugated 1,3-diene linear block copolymer, said block copolymer having a diene content exceeding 80 wt % and, respectively, a vinyl aromatic monomer content of less than 20 wt %.

2. A rubber-reinforced vinyl aromatic copolymer as claimed in claim 1, wherein the quantity of diene rubber mixture i) and block copolymer ii) varies from 4 to 30 wt % based on the copolymer weight.

3. A rubber-reinforced vinyl aromatic copolymer as claimed in claim 1, wherein the diene rubber is synthetic and consists of a conjugated 1,3-diene polymer containing from 4 to 6 carbon atoms.

4. A rubber-reinforced vinyl aromatic copolymer as claimed in claim 3, wherein the diene rubber is polybutadiene.

5. A rubber-reinforced vinyl aromatic copolymer as claimed in claim 4, wherein the polybutadiene has:
   a Mooney viscosity of between 20 and 70 ML 1+4 at 100° C. when measured in accordance with ASTM D 1646-80;
   a viscosity in solution of between 40 and 200 cps when measured as a 5 wt % solution in styrene at 25° C.;
   a 1,2-vinyl content of between 5 and 35 wt %; and
   a 1,4-cis content of between 20 and 85 wt %.

6. A rubber-reinforced vinyl aromatic copolymer as claimed in claim 1 wherein the linear block copolymer ii) has one of the following formulas (I), (II) and (III):
   (I) S-B;
   (II) S$_1$—B—S$_2$;
   (III) B$_1$—S$_1$—B$_2$—S$_2$;
   in which S, S$_1$ and S$_2$ are non-elastomeric polymer blocks of a vinyl aromatic monomer, with equal or different molecular weights, and B, B$_1$ and B$_2$ are elastomeric polymer blocks, based on a conjugated diene, with equal or different molecular weight.

7. A rubber-reinforced vinyl aromatic copolymer as claimed in claim 6, wherein random and/or tapered portions of molecular weight between 500 and 30,000 are present among the polymer blocks S, S$_1$, S$_2$ and B, B$_1$, B$_2$.

8. A rubber-reinforced vinyl aromatic copolymer as claimed in claim 1, wherein the linear block copolymer ii) has a Mooney viscosity of not less than 20 ML-1+4 at 100° C. when measured in accordance with ASTM D 1646-80, a viscosity in solution of not less than 20 cps when measured as a 5 wt % solution in styrene at 25° C., and a styrene content of 15 wt % or less.

9. A rubber-reinforced vinyl aromatic copolymer as claimed in claim 1, wherein the conjugated 1,3-diene is 1,3-butadiene.

10. A rubber-reinforced vinyl aromatic copolymer as claimed in claim 1, wherein the polymeric matrix is a polymer derived from one or more vinyl aromatic monomers.

11. A rubber-reinforced vinyl aromatic copolymer as claimed in claim 1, wherein the polymeric matrix is a copolymer derived from one or more vinyl aromatic monomers and one or more acrylic monomers.

12. A rubber-reinforced vinyl aromatic copolymer as claimed in claim 11, wherein the quantity of acrylic monomer varies from 5 to 45 wt %, and the vinyl aromatic quantity correspondingly varying from 95 to 55 wt %.

13. A rubber-reinforced vinyl aromatic copolymer as claimed in claim 1, wherein the vinyl aromatic monomer is of the formula (IV):

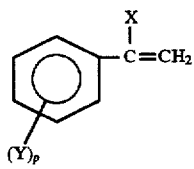

(IV)

in which X represents hydrogen or a $C_1$–$C_4$ alkyl radical, p is zero or a whole number between 1 and 5, and Y represents a halogen or a $C_1$–$C_4$ alkyl radical.

14. A rubber-reinforced vinyl aromatic copolymer as claimed in claim 13, wherein the vinyl aromatic monomer is styrene.

15. A rubber-reinforced vinyl aromatic copolymer as claimed in claim 11, wherein the acrylic monomer is acrylonitrile.

16. A process for producing the rubber-reinforced vinyl aromatic copolymer in accordance with claim 1, consisting of dissolving the mixture of diene rubber i) and block copolymer ii) in the monomer or monomers, optionally in the presence of an inert solvent in a quantity which can vary from 5 to 100 wt % on the mixture, then subjecting the resultant solution to polymerization, in the presence of an initiator, in two or more agitated vertical tubular plug flow reactors arranged in series, their length/diameter ratio exceeding 2.

17. A process according to claim 16, wherein each reactor is maintained at a pressure of between 0.5 and 5 bar, and is divided into two or more zones heated to different temperatures between 70° and 170° C., the residence time of the monomers in the first zone of the first reactor being at least equal to get halving of the life of the initiator at polymerization temperature.

18. A rubber-reinforced vinyl aromatic copolymer as claimed in claim 1, wherein the quantity of diene rubber mixture i) and block copolymer ii) varies from 6 to 25 wt % based on the copolymer weight.

19. A rubber-reinforced vinyl aromatic copolymer as claimed in claim 4, wherein the polybutadiene has:

a Mooney viscosity of between 25 and 65 ML 1+4 at 100° C. when measured in accordance with ASTM D 1646-80;

a viscosity in solution of between 40 and 120 cps when measured as a 5 wt % solution in styrene at 25° C.;

a 1,2-vinyl content of between 7 and 14 wt %; and a 1,4-cis content of between 25 and 45 wt %.

20. A rubber-reinforced vinyl aromatic copolymer as claimed in claim 1, wherein the linear block copolymer ii) has a Mooney viscosity between 25 and 50 ML-1+4, when measured in accordance with ASTM D 1646-80, a viscosity in solution of between 25 and 60 cps when measured as a 5 wt % solution in styrene at 25° C., and a styrene content of 15 wt % or less.

21. A rubber-reinforced vinyl aromatic copolymer as claimed in claim 11, wherein the quantity of acrylic monomer varies from 15 to 35 wt %, the vinyl aromatic quantity correspondingly varying from 85 to 65 wt %.

22. A process for producing the rubber-reinforced vinyl aromatic copolymer in accordance with claim 1, consisting of dissolving the mixture of diene rubber i) and block copolymer ii) in the monomer or monomers, optionally in the presence of an inert solvent in a quantity which can vary from 5 to 100 wt % on the mixture, then subjecting the resultant solution to polymerization, in the presence of an initiator, in two or more agitated vertical tubular plug flow reactors arranged in series, their length/diameter ratio being between 3 and 10.

* * * * *